(No Model.) 2 Sheets—Sheet 1.
M. H. DEVEY.
CONDUIT FOR ELECTRICAL WIRES.
No. 314,655. Patented Mar. 31, 1885.
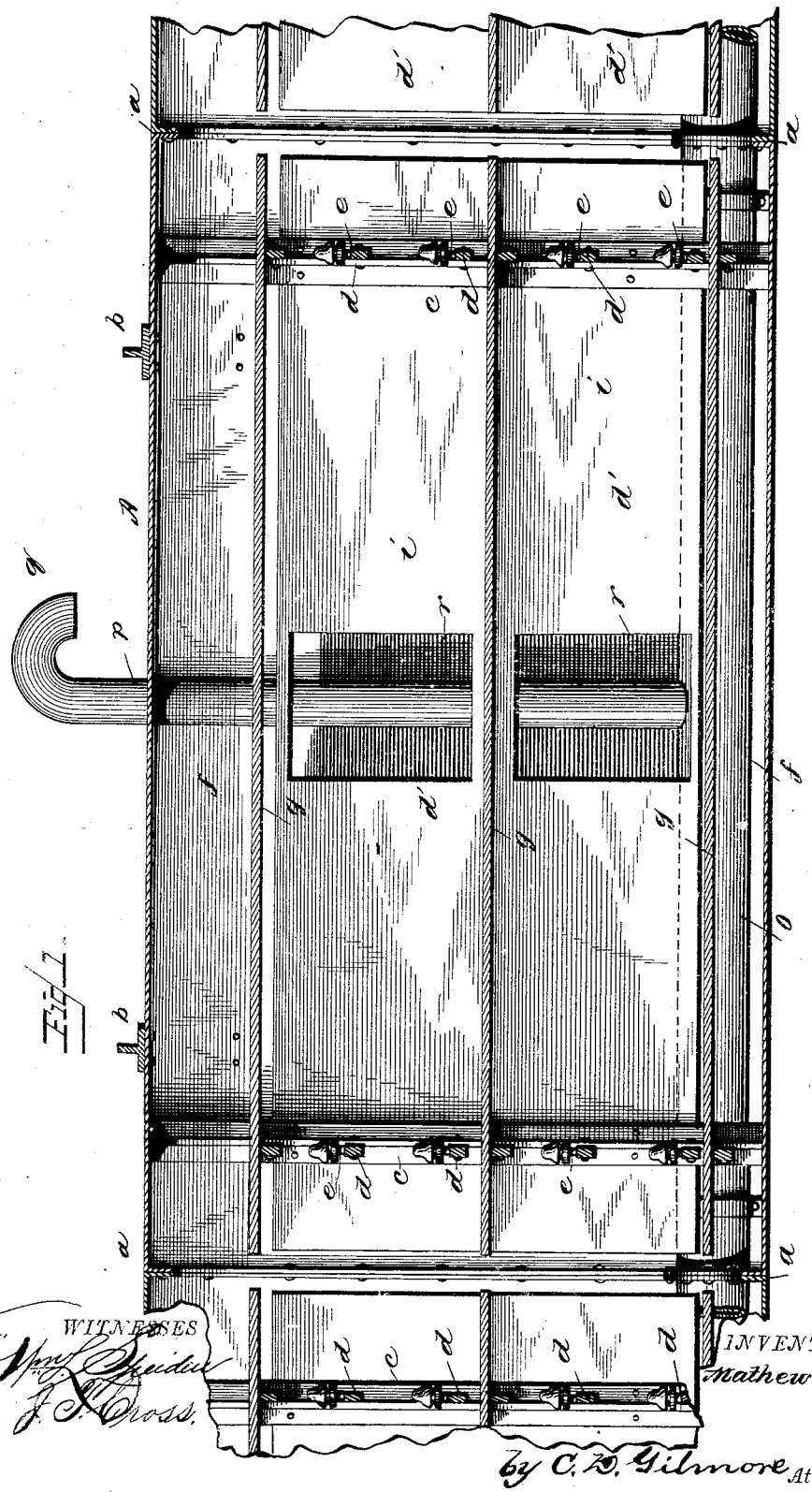

(No Model.) 2 Sheets—Sheet 2.
M. H. DEVEY.
CONDUIT FOR ELECTRICAL WIRES.
No. 314,655. Patented Mar. 31, 1885.
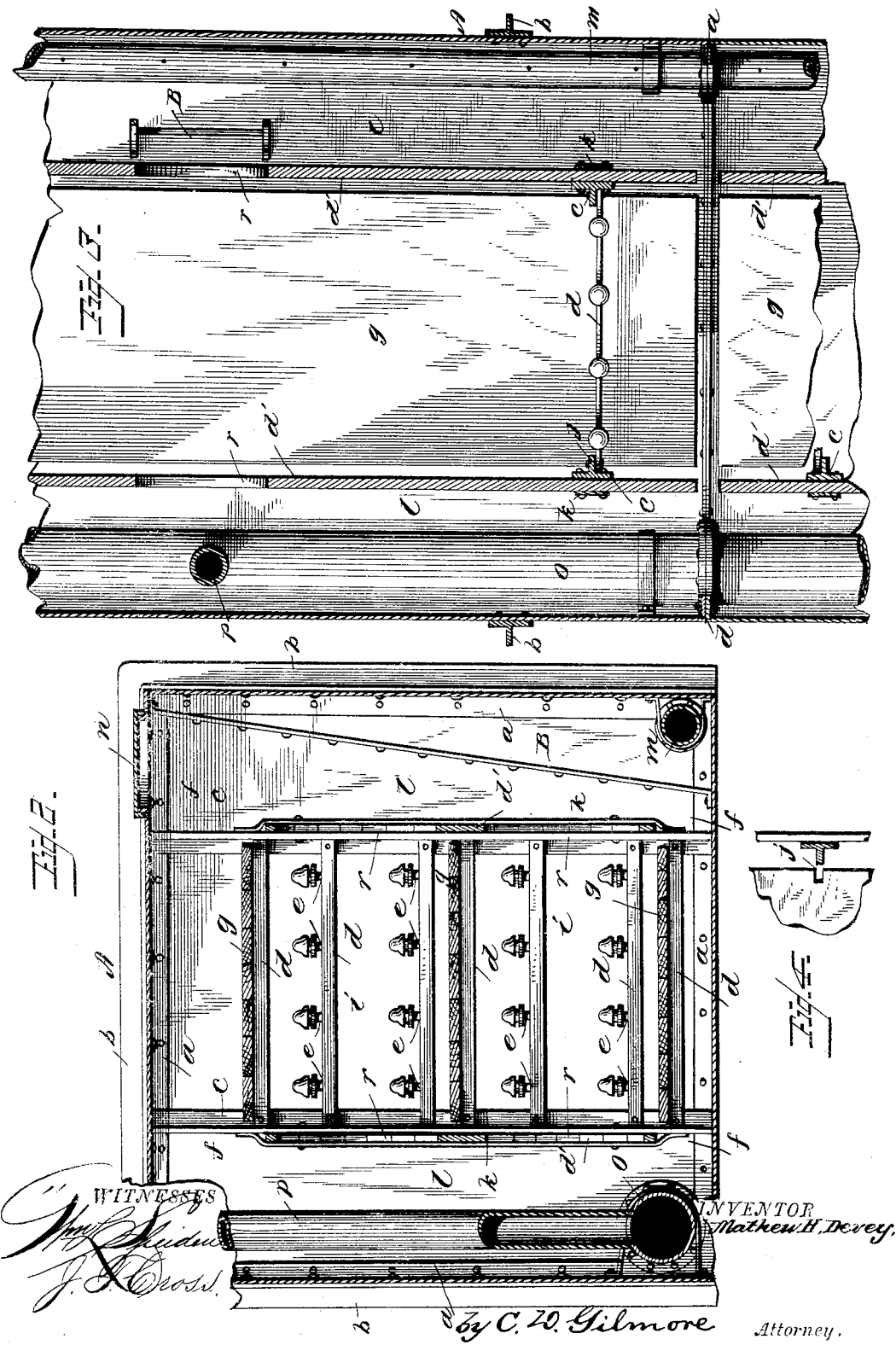

United States Patent Office.

MATHEW H. DEVEY, OF CHESTER, PENNSYLVANIA.

CONDUIT FOR ELECTRICAL WIRES.

SPECIFICATION forming part of Letters Patent No. 314,655, dated March 31, 1885.

Application filed November 11, 1884. (No model.)

*To all whom it may concern:*

Be it known that I, M. H. DEVEY, a citizen of the United States of America, residing at Chester, in the county of Delaware and State of Pennsylvania, have invented certain new and useful Improvements in Conduits for Electrical Wires, of which the following is a specification, reference being had therein to the accompanying drawings.

This invention has relation to improvements in that class of devices known as "conduits for electrical wires;" and it consists in the novel construction and arrangement of devices, as will be hereinafter fully explained, and particularly pointed out in the appended claims.

The annexed drawings, to which reference is made, fully illustrate my invention, in which—

Figure 1 represents a vertical sectional view of my device. Fig. 2 is a cross-sectional view of the same. Fig. 3 is a horizontal section, and Fig. 4 is a detail.

Referring to the accompanying drawings by letter, A designates one section of the conduit, which is preferably constructed of metal, which is rectangular in cross-section, and designed to be connected to similar sections any length or distance desired. At each end the section is provided with flanges $a$, to which the opposite section is secured by bolts, and upon the top and sides said section is provided with transverse strengthening-ribs $b$. Within the section, and extending from top to bottom, are T-shaped posts $c$, which are connected to one another by transverse bars $d$, the latter having the lugs $e$, to which the wires are attached or strung. On the outside of each of said vertical posts $c$ are walls $d'$, which are shorter in length than the posts, thus leaving spaces $ff$ between the top and bottom of the conduit. On the cross-bars $d$ are laid boards $g$, which separate the space within the conduit in compartments $i$. These boards are removably applied thereto, and are provided with notches $j$, which engage the post and are held in position thereby, and the side boards are also designed to be removably applied by sliding them within the loop-guides $k$ on each of the posts aforesaid. Between the outer side walls of the conduit and the vertical side boards attached to the posts are passage-ways or spaces $l$, extending the entire length of each section, and in one passage is provided a pipe, $m$, running parallel with the side walls, and perforated to admit pure air in the conduit, which may be supplied by a fan or otherwise from headquarters, thus keeping the air pure and the conduit healthy for the workmen while engaged in stringing the wires or repairing them.

B represents a ladder within the side space or passage, and extends to the top of the conduit and to the man-hole $n$, which latter is provided with a water-tight cover securely locked or bolted to prevent any one descending into the conduit, unless an employé. The opposite space in the conduit is provided with a pipe, $o$, running parallel to the side walls of the conduit, which conveys heated air through the latter, and extending vertically from said hot-air pipe is a smaller escape-pipe, $p$, which extends to the surface of the earth, and is provided with a bent end, $q$, in order to exclude rain, hail, &c., and preventing it from entering the hot-air pipe.

The side boards are provided with doors or openings $r$, whereby the employé may enter the compartments to put in new wires or repair old ones.

It is intended that the conduit be lighted by electric lights its entire length, the wires of which can be strung upon the supports aforesaid.

The space above the side boards serves to permit the workman to drill through the side wall of the conduit and into a building, through which drilled hole the wires may be passed or connected to the building without disturbing the sidewalk or pavement, and the conduit gives ample accommodation to the wires, which latter are free from obstructions, and by heating the conduit, thus expelling moisture, the naked wires can be used successfully; and by my construction of conduit I am enabled to make repairs, string the wires, &c., without removing the sidewalk or earth, as well as permitting the attachment of the wires to the building very readily.

Having described my invention, what I claim, and desire to secure by Letters Patent, is—

1. In a conduit for electrical wires, the combination, with the conduit-section, of the heating-pipe, escape-pipe, and pure-air-supply pipe, and suitable supports for the wires, substantially as described.

2. The herein-described conduit, consisting of the rectangular frame having the connecting-flanges at its ends, strengthening-ribs, hot-air and pure cold-air pipes running parallel to the side walls, and the vertical T-shaped supports or posts having the cross-bars for supporting the wires, substantially as described.

3. The combination, in a conduit, of the rectangular frame provided with the strengthening-ribs, end flanges, the hot and cold air pipes, vertical posts connected by the supporting cross-bars on which the wires are strung, the side boards removably secured to said posts, and the horizontal boards having the side notches to engage the flange of the post, whereby the same can be removed, and forming compartments in the conduit, substantially as described.

In testimony whereof I affix my signature in presence of two witnesses.

MATHEW H. DEVEY.

Witnesses:
WILLIAM GIBBS,
JACOB CLINE.